(12) United States Patent
Zhu (10) Patent No.: US 12,063,630 B2
(45) Date of Patent: Aug. 13, 2024

(54) METHOD AND DEVICE FOR INDICATING RESOURCE OCCUPATION STATE, AND METHOD AND DEVICE FOR DETERMINING RESOURCE OCCUPATION STATE

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 276 days.

(21) Appl. No.: 17/415,683

(22) PCT Filed: Dec. 21, 2018

(86) PCT No.: PCT/CN2018/122854
§ 371 (c)(1),
(2) Date: Jun. 17, 2021

(87) PCT Pub. No.: WO2020/124597
PCT Pub. Date: Jun. 25, 2020

(65) Prior Publication Data
US 2022/0053473 A1    Feb. 17, 2022

(51) Int. Cl.
*H04W 72/044* (2023.01)
*H04W 16/14* (2009.01)
*H04W 74/0808* (2024.01)

(52) U.S. Cl.
CPC ......... *H04W 72/044* (2013.01); *H04W 16/14* (2013.01); *H04W 74/0808* (2013.01)

(58) Field of Classification Search
CPC  H04W 72/044; H04W 16/14; H04W 74/0808
See application file for complete search history.

(56) References Cited

U.S. PATENT DOCUMENTS

2017/0280331 A1   9/2017  Gou et al.
2018/0176912 A1   6/2018  Li et al.
(Continued)

FOREIGN PATENT DOCUMENTS

CN    104507108 A    4/2015
CN    105992373 A    10/2016
(Continued)

OTHER PUBLICATIONS

International Search Report issued in PCT/CN2018/122854, dated Sep. 19, 2019 with English translation, (4p).
(Continued)

*Primary Examiner* — Kevin M Cunningham
(74) *Attorney, Agent, or Firm* — Arch & Lake LLP (57) ABSTRACT

A method is provided for indicating a resource occupation state. The method includes: performing detection with respect to a first frequency domain resource within an unlicensed frequency band to determine whether the first frequency domain resource is free; and if so, using the first frequency domain resource to transmit uplink information to a base station, where the uplink information provides indications including an indication stating whether the base station and a terminal can co-occupy the first frequency domain resource.

20 Claims, 7 Drawing Sheets

---

Receive uplink information transmitted by a terminal — S21

Determine the content indicated by the terminal according to the indication information, and the content indicated by the terminal comprises whether the base station and the terminal being able to jointly occupy a first frequency domain resource in a unlicensed frequency band — S221

(56) References Cited

U.S. PATENT DOCUMENTS

| | | | | |
|---|---|---|---|---|
| 2020/0053798 | A1* | 2/2020 | Tsai | H04W 74/0833 |
| 2020/0274660 | A1* | 8/2020 | Xiong | H04L 5/0055 |
| 2021/0044392 | A1* | 2/2021 | Myung | H04L 1/1864 |
| 2022/0116152 | A1* | 4/2022 | Iyer | H04L 1/188 |
| 2023/0300809 | A1* | 9/2023 | Kusashima | H04W 74/02 370/336 |

FOREIGN PATENT DOCUMENTS

| | | |
|---|---|---|
| CN | 106413096 A | 2/2017 |
| CN | 106612553 A | 5/2017 |
| CN | 107889114 A | 4/2018 |
| CN | 108702795 A | 10/2018 |
| CN | 111543100 A | 8/2020 |
| CN | 112929965 A | 6/2021 |
| EP | 3800952 A1 | 4/2021 |
| WO | 2016154907 A1 | 10/2016 |
| WO | 2018106911 A2 | 6/2018 |
| WO | 2020030186 A1 | 2/2020 |

OTHER PUBLICATIONS

Interdigital Inc., "Configured Grant Enhancements in NR-U", 3GPP TSG RAN WG1 Meeting #94bis, R1-1811207, Chengdu, China, Oct. 8-12, 2018, (5p).

Samsung, "Enhancements on Configured Grant for NR-U", 3GPP TSG-RAN WG1 Meeting #95 R1-1812980, Spokane, WA, Nov. 12-16, 2018, (4p).

Ericsson, "Configured UL Grant for NR-U", 3GPP TSG-RAN WG1 Meeting #95, R1-1813461, Spokane, WA, Nov. 12-16, 2018, (5p).

First Office Action issued to Indian Application No. 202127029662 dated Mar. 2, 2022 with partial translation, (7p).

Extended European Search Report issued in Application No. 18943579.5, dated Jun. 14, 2022,(11p).

MediaTek Inc, "Discussion on NR-U configured grant" 3GPP TSG RAN WG1 #95, R1-1812359, Spokane, USA, Nov. 12-16, 2018, (3p).

InterDigital Inc, "Configured Grant Enhancements in NR-U" 3GPP TSG RAN WG1 #95, R1-1813223, Spokane, USA, Nov. 12-16, 2018, (5p).

LG Electronics, "Discussion on AUL-initiated COT sharing for LAA" 3GPP TSG RAN WG1 #94, R1-1808464, Gotgebburg, Sweden, Aug. 20-24, 2018, (4p).

Office action of CN 201880003021.5 dated Oct. 8, 2022, 14 p.

Fujitsu, "Discussion on frequency domain resource allocation," 3GPP TSG RAN WG1 Meeting 90bis, R1-1717718, Prague, Czech Republic, Oct. 9-13, 2017, (4p).

Huawei, HiSilicon, "Discussion on remaining frequency resources on symbol carrying Coreset," 3GPP TSG RAN WG1 Ad hoc Meeting, R1-1711433, Qingdao, China, Jun. 27-30, 2017, (3p).

CNOA issued in Application No. 201880003021.5 dated Mar. 27, 2024 with English translation, (6p).

\* cited by examiner

METHOD AND DEVICE FOR INDICATING RESOURCE OCCUPATION STATE, AND METHOD AND DEVICE FOR DETERMINING RESOURCE OCCUPATION STATE

CROSS-REFERENCE TO RELATED APPLICATION

The present application is the U.S. national phase application of International Application No. PCT/CN2018/122854, filed on Dec. 21, 2018, the disclosure of which is incorporated hereby in its entirety for all purposes.

TECHNICAL FIELD

The present disclosure relates to the field of communication technology, and in particular, to a method for indicating resource occupation, a device for indicating resource occupation, a method for determining resource occupation, a device for determining resource occupation, an electronic device, and a computer-readable storage medium.

BACKGROUND

In order to expand a communication frequency band of a terminal, a License Assisted Access (LAA) mechanism is proposed in 3GPP to use an unlicensed frequency band.

Regarding frequency domain resources in an unlicensed frequency band, the base station can initiate occupation of said frequency domain resources, and during the occupation of the frequency domain resources, the terminal and the base station can jointly occupy the frequency domain resources, so that communication between the terminal and the base station can be made via the frequency domain resources. In some cases, the terminal can also initiate occupation of frequency domain resources in an unlicensed frequency band, but when the terminal occupies the frequency domain resources in the unlicensed frequency band, the base station does not know whether it can jointly occupy the frequency domain resources with the terminal to perform communication.

SUMMARY

According to a first aspect of the present disclosure, there is provided a method for indicating resource occupation. The method includes that a terminal detects a first frequency domain resource in an unlicensed frequency band to determine whether the first frequency domain resource is idle.

Additionally, in response to determining that the first frequency domain resource is idle, the terminal transmits uplink information to a base station through the first frequency domain resource, where the uplink information comprises an indication function indicating whether the base station and the terminal are capable of jointly occupying the first frequency domain resource.

According to a second aspect of the present disclosure, there is provided a method for determining resource occupation. The method includes that a base station receives uplink information transmitted by a terminal and determines content indicated by the terminal according to the uplink information. Further, the content indicated by the terminal comprises whether the base station and the terminal are capable of jointly occupying a first frequency domain resource in an unlicensed frequency band.

According to a third aspect of the present disclosure, there is provided an electronic equipment including a processor and a memory for storing instructions executable by the processor.

Further, the processor is configured to perform the steps in the method for indicating resource occupation and/or the method for determining resource occupation described in any one of the above embodiments.

According to a fourth aspect, there is provided a computer-readable storage medium having computer programs stored thereon, when the programs are executed by a processor, the steps in the method for indicating resource occupation and/or the method for determining resource occupation described in any one of the above embodiments are implemented.

BRIEF DESCRIPTION OF THE DRAWINGS

In order to more clearly illustrate technical solutions in the embodiments of the present application, the following will briefly introduce the drawings used in the description of the embodiments. Obviously, the drawings in the following description are only some of the embodiments of the present application. For those of ordinary skill in the art, without having creative labor, other drawings may be obtained based on these drawings.

DETAILED DESCRIPTION

The technical solutions in the embodiments of the present disclosure will be described clearly and completely below in conjunction with the drawings in the embodiments of the present disclosure. Obviously, the described embodiments are only a part of the embodiments of the present disclosure, not all embodiments. Based on the embodiments in this disclosure, all other embodiments obtained by a person of ordinary skill in the art without creative work fall within the scope of protection of this disclosure.

Figure 1:
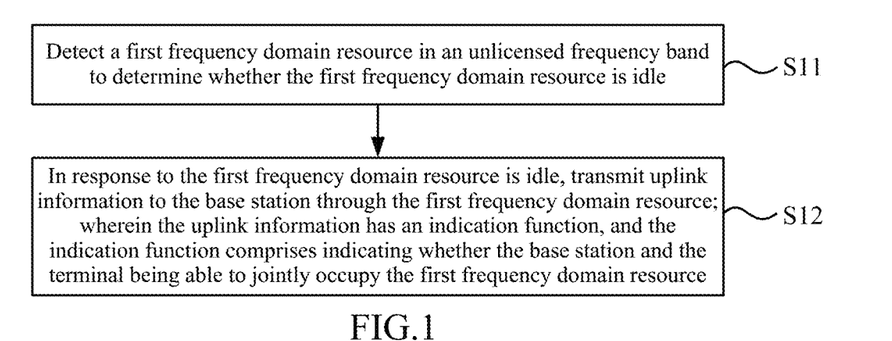
FIG. 1 is a schematic flowchart showing a method for indicating resource occupation according to an embodiment of the present disclosure.

FIG. 1 is a schematic flowchart of a method for indicating resource occupation according to an embodiment of the present disclosure. The method described in this embodiment can be applied to a terminal, wherein the terminal can be used as a user equipment to communicate with a base station, and the terminal includes electronic devices such as mobile phones, tablets, and wearable devices. The base station and the terminal can communicate with other based on 5G NR.

As shown in FIG. 1, the method for indicating resource occupation may include the following steps.

In step S11, a first frequency domain resource in an unlicensed frequency band is detected to determine whether the first frequency domain resource is idle;

In step S12, in response to the first frequency domain resource is idle, uplink information to the base station is transmitted through the first frequency domain resource;

Wherein, the uplink information has an indication function, and the indication function includes indicating whether the base station and the terminal can jointly occupy the first frequency domain resource.

It should be noted that the jointly occupation referred to in this embodiment refers to that the base station is able to transmit information during the occupation of frequency domain resources initiated by the terminal.

In an embodiment, the terminal may initiate the occupation of the first frequency domain resource in the unlicensed frequency band in some cases. According to the embodiment of the present disclosure, the terminal may initiate the occupation of the first frequency domain resource in the unlicensed frequency band. That is, the terminal detects the first frequency domain resource in the unlicensed frequency band, and determines that the terminal can occupy the first frequency domain resource when the first frequency domain resource is idle, and can use the first frequency domain resource to transmit uplink information to the base station.

Since the uplink information has an indication function, and the indication function includes indicating whether the base station can jointly occupy the first frequency domain resource together with the terminal, so that after the base station receives the uplink information on the first frequency domain resource, the base station may determine whether the first frequency domain resource can be occupied jointly with the terminal.

Accordingly, the base station can be enabled to determine whether the first frequency domain resource can be jointly occupied with the terminal, and then when it is determined that the first frequency domain resource can be jointly occupied with the terminal, the base station can jointly occupy the first frequency domain resource with the terminal to perform communication, so that the first frequency domain resource is not only occupied by the terminal, but also occupied by the base station, which is beneficial to improving the utilization rate of the frequency domain resource on the unlicensed frequency band.

Among them, the way of detecting the first frequency domain resource in the unlicensed frequency band involved in the embodiments of the present disclosure to determine whether the first frequency domain resource is idle includes but not limited to Listen Before Talk (LBT, i.e., listen first, then speak). The following example mainly uses LBT as a way of detecting the first frequency domain resource to exemplify the embodiments of the present disclosure.

It should be noted that the first frequency domain resource may be at least one of the following: a carrier, a bandwidth part in the same carrier, and a bandwidth part in different carriers.

Figure 2:
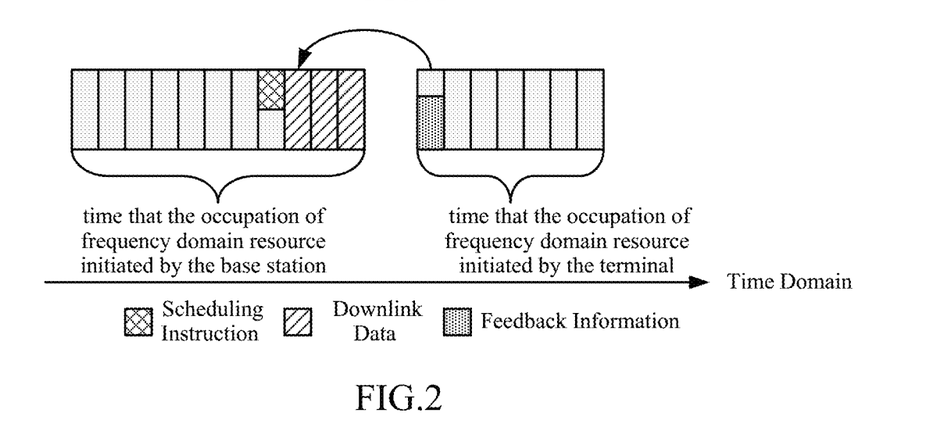
FIG. 2 is a schematic diagram showing a terminal initiating occupation for frequency domain resources in an unlicensed frequency band according to an embodiment of the present disclosure.

FIG. 2 is a schematic diagram showing a terminal initiating occupation for frequency domain resources in an unlicensed frequency band according to an embodiment of the present disclosure.

For example, as shown in FIG. 2, in a time that the occupation of frequency domain resource initiated by the base station, the base station transmits a scheduling instruction and downlink data to the terminal in the last few time domain resources (such as symbols), and the terminal need to transmit feedback information for the downlink data to the base station so as to have a complete communication process. However, in the time that the occupation of frequency domain resource initiated by the base station, in case that there is no remaining time domain resource for the terminal to use, in order for the terminal completing the communication process with the base station, the terminal can initiate the occupation of frequency domain resource, thus transmitting feedback information for the downlink data to the base station within the time that the occupation of the frequency domain resource is initiated by the terminal.

Figure 3:
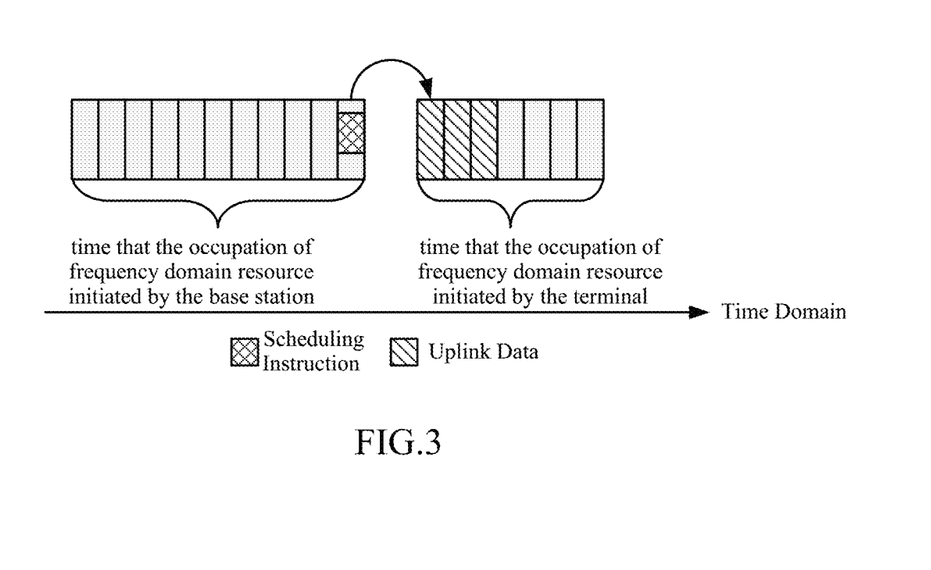
FIG. 3 is a schematic diagram showing another terminal initiating occupation for frequency domain resources in an unlicensed frequency band according to an embodiment of the present disclosure.

FIG. 3 is a schematic diagram showing another terminal initiating occupation for frequency domain resources in an unlicensed frequency band according to an embodiment of the present disclosure.

For example, as shown in FIG. 3, in the time that the occupation of frequency domain resource initiated by the base station, the base station transmits a scheduling instruction to the terminal in the last one time domain resource (such as a symbol). The scheduling instruction is used to instruct the terminal to transmit uplink data to the base station, and the terminal needs to transmit uplink data to the base station to complete the whole communication process. However, in the time that the occupation of frequency domain resource initiated by the base station, in case that there is no remaining time domain resources for the terminal to use, in order to complete the communication process with the base station, the terminal can initiate the occupation of frequency domain resource, thus transmitting uplink data scheduled by the scheduling instruction to the base station within the time that the occupation of the frequency domain resource is initiated by the terminal.

Optionally, the indication function further includes first time domain information indicating that the terminal occupies the first frequency domain resource.

In an embodiment, the indication function further includes first time domain information indicating that the terminal occupies the first frequency domain resource. Based on this, the base station can determine the first time domain information that the terminal occupies the first frequency domain resource according to the uplink information transmitted by the terminal.

Optionally, the first time domain information includes:
a first starting moment and a first duration; and/or
a first starting moment and a first ending moment.

In one embodiment, the first time domain information can be expressed in two forms, one form is expressed by the first starting moment and the first duration, and the second form is expressed by the first starting moment and the first ending moment.

Optionally, the indication function further includes a second time domain information indicating uplink data in the uplink information.

In an embodiment, the indication function further includes the second time domain information indicating the uplink data in the uplink information. Based on this, the base station can determine the second time domain information of the uplink data transmitted by the terminal according to the uplink information transmitted by the terminal, so that the base station can determine when beginning to occupy the first frequency resource.

Optionally, the second time domain information includes:
a second starting moment and a second duration; and/or
a second starting moment and a second ending moment.

In one embodiment, the second time domain information can be expressed in two forms, one form is expressed by the second starting moment and the second duration, and the second form is expressed by the second starting moment and the second ending moment.

Optionally, the uplink information includes uplink data and indication information, wherein the terminal implements the indication function through the indication information.

In an embodiment, the uplink information may carry uplink data and indication information specifically used to implement the indication function.

Figure 4:
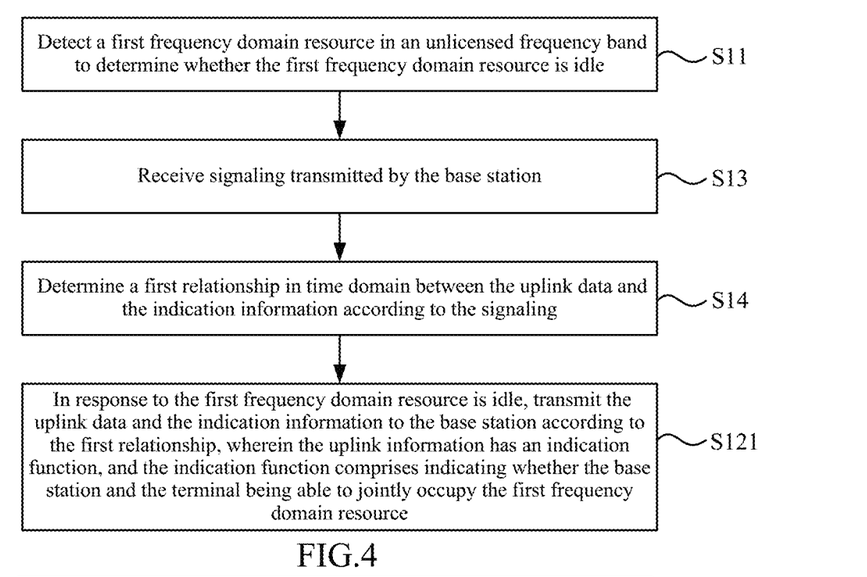
FIG. 4 is a schematic flowchart showing another method for indicating resource occupation according to an embodiment of the present disclosure.

FIG. 4 shows a schematic flowchart showing another method for indicating resource occupation according to an embodiment of the present disclosure. As shown in FIG. 4, on the basis of the embodiment shown in FIG. 1, before transmitting uplink information to the base station through the first frequency domain resource, the method further includes the following steps.

In step S13, a signaling transmitted by the base station is received.

In step S14, a first relationship in time domain between the uplink data and the indication information is determined according to the signaling.

The step S12 (i.e., in response to the first frequency domain resource is idle, transmitting uplink information to the base station through the first frequency domain resource) includes following steps.

In step S121, if the first frequency domain resource is idle, the uplink data and the indication information are transmitted to the base station according to the first relationship.

In an embodiment, in case that the uplink information includes uplink data and indication information, the terminal may determine an order of the uplink data and indication information in time domain according to the first relationship, so as to transmit the uplink data and indication information to the base station according to the first relationship and then the base station can receive the uplink data and the indication information according to the first relationship.

Wherein, the base station may indicate the first relationship to the terminal by transmitting signaling to the terminal, and the signaling may be a Radio Resource Control (RRC) signaling, or a Media Access Control Control Element (MAC CE) signaling, or a physical layer signaling.

Figure 5:
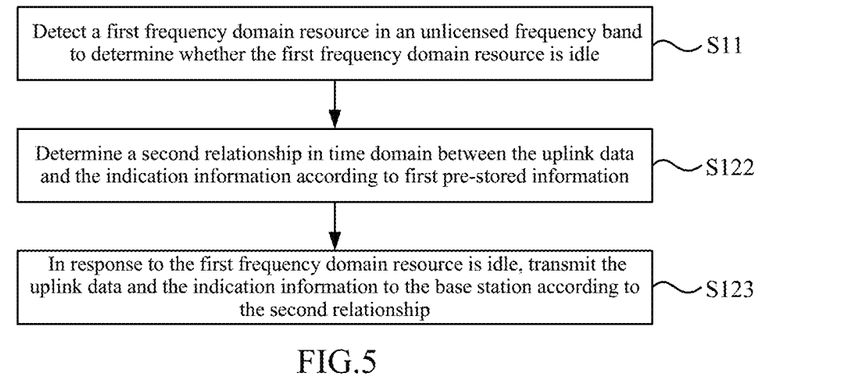
FIG. 5 is a schematic flowchart showing yet another method for indicating resource occupation according to an embodiment of the present disclosure.

FIG. 5 is a schematic flowchart showing yet another method for indicating resource occupation according to an embodiment of the present disclosure. As shown in FIG. 5, based on the embodiment shown in FIG. 1, the step S12 (i.e., in response to the first frequency domain resource is idle, transmitting uplink information to the base station through the first frequency domain resource) includes following steps:

In step S122, a second relationship in time domain between the uplink data and the indication information is determined according to first pre-stored information;

In step S123, in response to the first frequency domain resource is idle, the uplink data and the indication information are transmitted to the base station according to the second relationship.

In an embodiment, in case that the uplink information includes uplink data and indication information, the terminal may determine an order of the uplink data and indication information in time domain based on the second relationship, so as to transmit the uplink data and the indication information to the base station according to the second relationship, and in turn the base station may receive the uplink data and the indication information according to the second relationship.

Wherein, the terminal may pre-store information for determining the second relationship, that is, the first pre-stored information, based on a communication protocol with the base station, and determine the second relationship according to the first pre-stored information. The base station may pre-store information for determining the second relationship (such as a second pre-stored information) according to the communication protocol with the terminal, and in turn when receiving uplink information transmitted by the terminal, the second relationship can be determined based on the second pre-stored information, and the uplink data and indication information in the second information can be received according to the second relationship.

Figure 6:
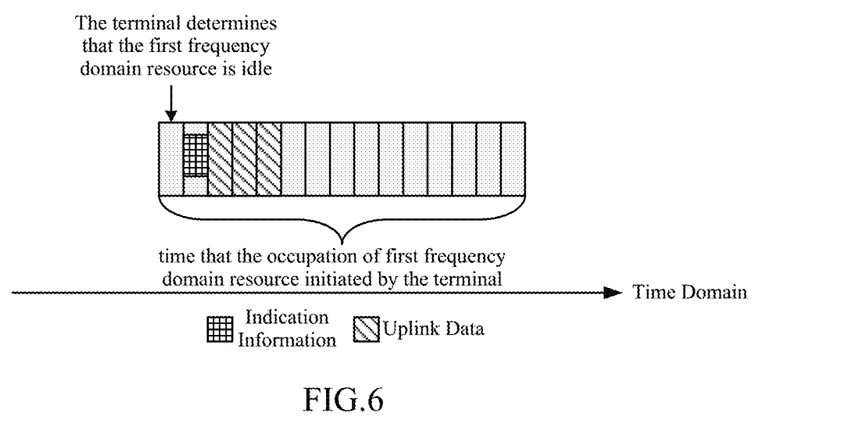
FIG. 6 is a schematic diagram showing a relationship between uplink data and indication information according to an embodiment of the present disclosure.
Figure 7:
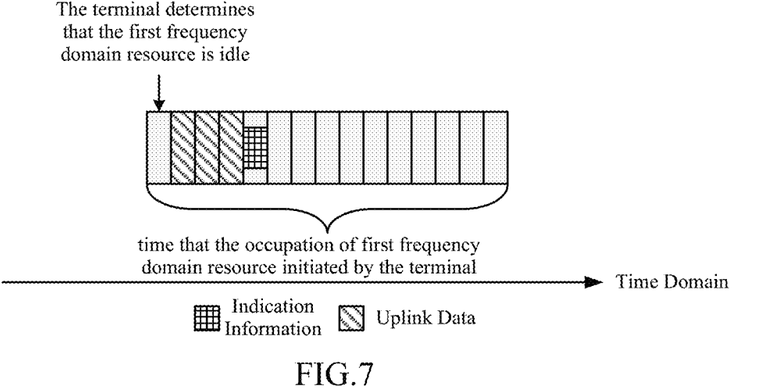
FIG. 7 is a schematic diagram showing another relationship between uplink data and indication information according to an embodiment of the present disclosure.

FIG. 6 is a schematic diagram showing a relationship between uplink data and indication information according to an embodiment of the present disclosure. FIG. 7 is schematic diagram showing another relationship between uplink data and indication information according to an embodiment of the present disclosure.

In an embodiment, the relationship between the uplink data and the indication information may be as shown in FIG. 6. The indication information is located on one time domain resource (such as a symbol) immediately before the uplink data. In this case, the terminal may transmit the indication information first, and then transmit uplink data; the base station can receive the indication information and uplink data according to the relationship between the uplink data and the indication information. Among them, the base station can, on the first frequency domain resource, determine whether the indication information is received, and if the indication information is received, then, according to the relationship between the uplink data and the indication information, the receiving of the uplink data can started from one time domain resource immediately behind the indication information.

In an embodiment, the relationship between the uplink data and the indication information may be as shown in FIG. 7. The indication information is located on one time domain resource (such as a symbol) immediately behind the uplink data. In this case, the terminal may transmit the uplink data first, and then transmit the indication information; the base station can receive the indication information and the uplink data according to the relationship between the uplink data and the indication information. Among them, the base station can, on the first frequency domain resource, determine whether the uplink data is received, and if the uplink data is received, then, according to the relationship between the uplink data and the indication information, the receiving of the indication information can be started from one time domain resource immediately behind the uplink data.

It should be noted that after determining that the first frequency domain resource is idle, the terminal can transmit uplink information to the base station in the next time domain resource; or the terminal can transmit uplink information to the base station after several time domain resources, as needed.

Optionally, the indication information is explicit information and/or implicit information.

In an embodiment, the indication information may be the explicit information, for example, selecting several bits in the uplink information to represent the indication information.

In an embodiment, the indication information may be the implicit information, for example, Radio Network Temporary Identity (RNTI) carried in the uplink information, or the scrambling sequence of Cyclic Redundancy Check may be used as the indication information.

Take the Radio Network Temporary Identity (RNTI) as an example. For example, if the radio network temporary identifier transmitted to the base station is a target radio network temporary identifier, then it indicates that the base station can jointly occupy the first frequency domain resource with the terminal. If the radio network temporary identifier transmitted to the base station is not the target radio network temporary identifier, then it indicates that the base station cannot jointly occupy the first frequency domain resource with the terminal.

In an embodiment, the indication information may also include both explicit information and implicit information. For example, select several bits in the uplink information to use as the explicit information to indicate whether the base station and the terminal can jointly occupy the first frequency domain resource, and the first time domain information of the first frequency domain resource jointly occupied by the base station and the terminal is indicated by the radio network temporary identifier carried in the uplink information.

Optionally, the uplink information includes uplink data, and the terminal implements the indication function through a traffic type of the uplink data.

In one embodiment, in addition to the manner in which the indication function is realized through specifically set indication information in the above embodiment, the indication function may also be realized through the traffic type of the uplink data in the uplink information, for example, a first traffic type is used to indicate that the base station can jointly occupy the first frequency domain resource with the terminal, and other traffic types are used to indicate that the base station cannot jointly occupy the first frequency domain resource with the terminal.

According to this, there is no need to set up specific indication information to realize the indication function, which is beneficial to reduce the data volume of uplink information, thereby reducing the communication load of the terminal and the base station.

Figure 8:
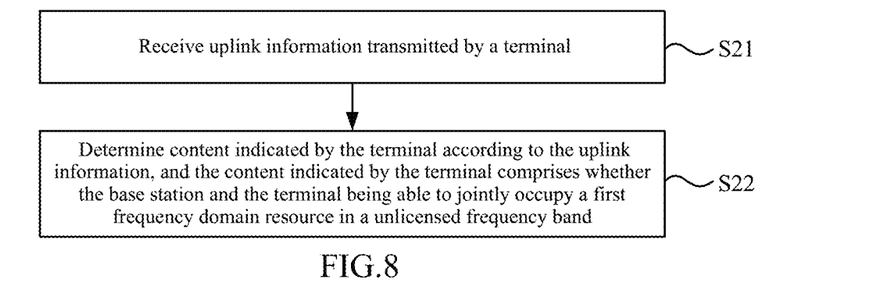
FIG. 8 is a schematic flowchart showing a method for determining resource occupation according to an embodiment of the present disclosure.

FIG. 8 is a schematic flowchart of a method for determining resource occupation according to an embodiment of the present disclosure. The method described in this embodiment can be applied to a base station. The base station can communicate with a terminal as user equipment. The terminal includes electronic devices such as mobile phones, tablets, and wearable devices. The base station and the terminal can communicate based on 5G NR.

As shown in FIG. 8, the method for determining resource occupation may include the following steps:

In step S21, uplink information transmitted by a terminal is received.

In step S22, content indicated by the terminal is determined according to the uplink information, and the content indicated by the terminal includes whether the base station and the terminal are able to jointly occupy a first frequency domain resource in an unlicensed frequency band.

According to this embodiment, by receiving the uplink information transmitted by the terminal, the base station can determine, based on the uplink information, whether it can jointly occupy (or share) the first frequency domain resource with the terminal, and then when it is determined that the first frequency domain resource can be shared with the terminal (or can be jointly occupied with the terminal), the first frequency domain resource is jointly occupied by the terminal and the base station for communication, so that the first frequency domain resource is not only occupied by the terminal, but also occupied by the base station, which is beneficial to increase the utilization rate of frequency domain resources in the unlicensed frequency band.

Optionally, the content indicated by the terminal further includes first time domain information of the first frequency domain resource occupied by the terminal.

In an embodiment, the content indicated by the terminal further includes the first time domain information of the first frequency domain resource occupied by the terminal. Based on this, the base station can determine the first time domain information the first frequency domain resource occupied by the terminal according to the uplink information transmitted by the terminal, so that the base station can determine when it can start jointly occupying the first frequency domain resource with the terminal and how long the first frequency domain resource can be occupied.

Optionally, the first time domain information includes:
a first starting moment and a first duration; and/or
a first starting moment and a first ending moment.

Optionally, the content indicated by the terminal further includes second time domain information of the uplink data in the uplink information.

In an embodiment, the content indicated by the terminal further includes the second time domain information of the uplink data in the uplink information. Based on this, the base station can determine the second time domain information of the uplink data transmitted by the terminal according to the uplink information transmitted by the terminal, so that the base station can determine when it can start receiving the uplink data transmitted by the terminal and how long it needs to receive.

Optionally, the second time domain information includes: a second starting moment and a second duration; and/or a second starting moment and the second ending moment.

Figure 9:
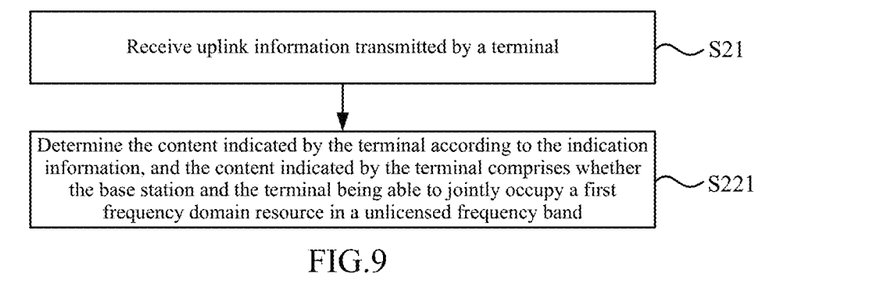
FIG. 9 is a schematic flowchart showing another method for determining resource occupation according to an embodiment of the present disclosure.

FIG. 9 is a schematic flowchart of another method for determining resource occupation according to an embodiment of the present disclosure. As shown in FIG. 9, based on the embodiment shown in FIG. 8, the uplink information includes uplink data and indication information, wherein the determining content indicated by the terminal according to the uplink information includes:

In step S221, the content indicated by the terminal is determined according to the indication information.

In an embodiment, the uplink information may carry uplink data and indication information specifically used to implement the indication function. The base station may determine the content indicated by the terminal according to the indication information.

Figure 10:
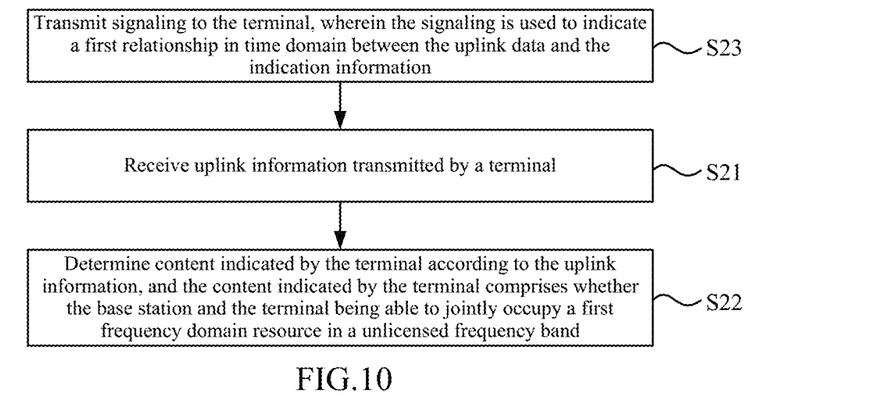
FIG. 10 is a schematic flowchart showing yet another method for determining resource occupation according to an embodiment of the present disclosure.

FIG. 10 is a schematic flowchart of yet another method for determining resource occupation according to an embodiment of the present disclosure. As shown in FIG. 10, based on the embodiment shown in FIG. 9, the method further includes following steps.

In step S23, signaling is transmitted to the terminal, wherein the signaling is used to indicate a first relationship in time domain between the uplink data and the indication information.

In an embodiment, the signaling may be a radio resource control signaling, or a Media Access Control Control Element (MAC CE) signaling, or a physical layer signaling.

Figure 11:
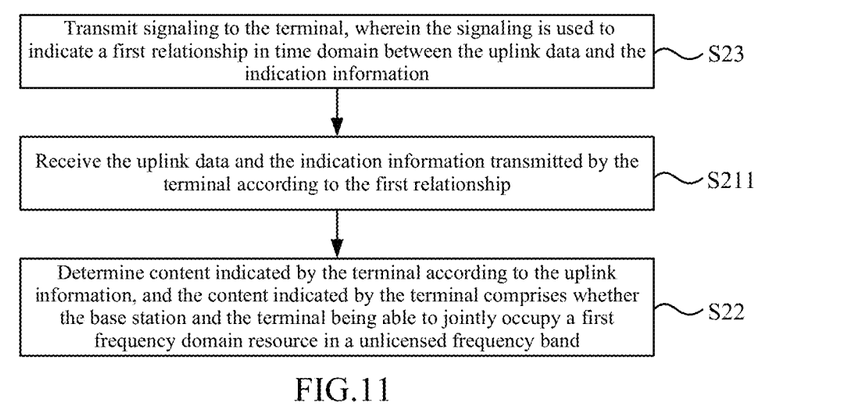
FIG. 11 is a schematic flowchart showing yet another method for determining resource occupation according to an embodiment of the present disclosure.

FIG. 11 is a schematic flowchart of yet another method for determining resource occupation according to an embodiment of the present disclosure. As shown in FIG. 11, based on the embodiment shown in FIG. 10, the receiving uplink information transmitted by the terminal includes following steps.

In step S211, the uplink data and the indication information transmitted by the terminal are received according to the first relationship.

In an embodiment, in the case where the uplink information includes uplink data and indication information, the base station may indicate the first relationship to the terminal by transmitting the signaling to the terminal, so that the terminal can determine an order of uplink data and the indication information in time domain according to the first relationship, and the uplink data and the indication information are transmitted to the base station according to the first relationship, and in turn the base station may receive the uplink data and the indication information according to the first relationship.

Figure 12:
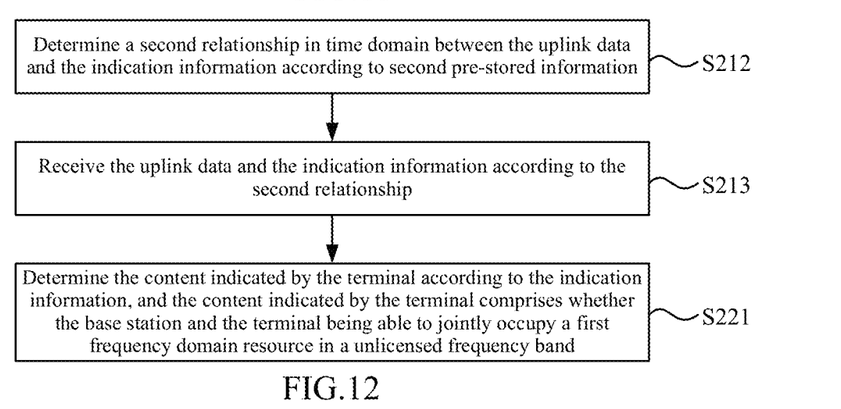
FIG. 12 is a schematic flowchart showing yet another method for determining resource occupation according to an embodiment of the present disclosure.

FIG. 12 is a schematic flowchart of yet another method for determining resource occupation according to an embodiment of the present disclosure. As shown in FIG. 12, based on the embodiment shown in FIG. 9, the receiving the uplink information transmitted by the terminal includes following steps.

In step S212, the second relationship in time domain between the uplink data and the indication information is determined according to the second pre-stored information;

In step S213, the uplink data and the indication information are received according to the second relationship.

In an embodiment, in case that the uplink information includes uplink data and indication information, the terminal may determine an order of the uplink data and indication information in time domain according to the second relationship, so as to transmit the uplink data and the indication information to the base station according to the second relationship, and in turn the base station may receive the uplink data and the indication information according to the second relationship.

Wherein, the terminal may pre-store information for determining the second relationship according to the communication protocol with the base station, that is, the first pre-stored information, and determine the second relationship based on the first pre-stored information. The base station may pre-store information for determining the second relationship according to the communication protocol with the terminal, that is, the second pre-stored information, and when receiving uplink information transmitted by the terminal, the second relationship can be determined based on the second pre-stored information, and the uplink data and indication information in the second information can be received according to the second relationship.

Optionally, the indication information is explicit information and/or implicit information.

Figure 13:
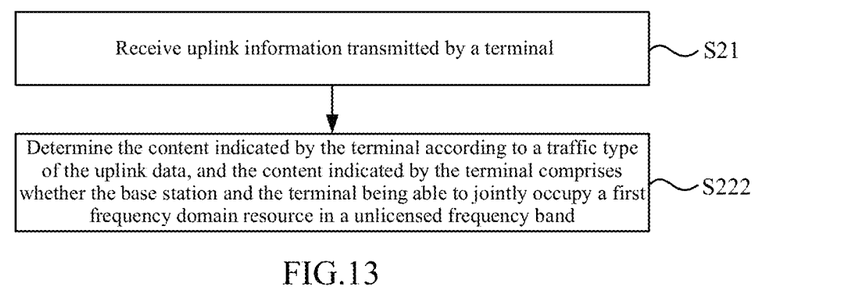
FIG. 13 is a schematic flowchart of another method for determining resource occupation according to an embodiment of the present disclosure.

FIG. 13 is a schematic flowchart of another method for determining resource occupation according to an embodiment of the present disclosure. As shown in FIG. 13, based on the embodiment shown in FIG. 8, the uplink information includes uplink data, and the determining content indicated by the terminal according to the uplink information includes following steps.

In step S222, the content indicated by the terminal is determined according to the traffic type of the data.

Corresponding to the foregoing embodiments of the method for indicating resource occupation and the method for determining the resource occupation, the present disclosure also provides embodiments of a device for indicating resource occupation and a device for determining resource occupation.

Figure 14:
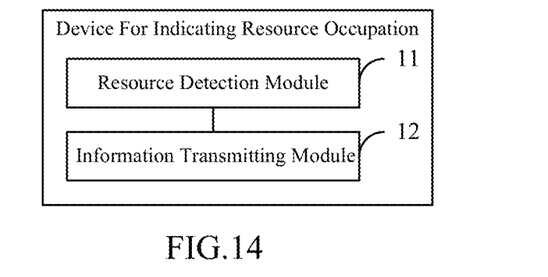
FIG. 14 is a schematic block diagram showing a device for indicating resource occupation according to an embodiment of the present disclosure.

FIG. 14 is a schematic block diagram showing a device for indicating resource occupation according to an embodiment of the present disclosure. The device described in this embodiment can be applied to a terminal, where the terminal can be used as user equipment to communicate with a base station. The terminal includes electronic equipment such as mobile phones, tablets, and wearable devices. The base station and the terminal can communicate based on 5G NR.

As shown in FIG. 14, the device for indicating resource occupation may include a resource detection module 11 and an information transmitting module 12.

The resource detection module 11 is configured to detect a first frequency domain resource in an unlicensed frequency band to determine whether the first frequency domain resource is idle.

The information transmitting module 12 is configured to transmit uplink information to the base station through the first frequency domain resource in response to the first frequency domain resource is idle.

wherein the uplink information has an indication function, and the indication function includes indicating whether the base station and the terminal being able to jointly occupy the first frequency domain resource.

Optionally, the indication function further includes first time domain information indicating that the terminal occupies the first frequency domain resource.

Optionally, the first time domain information includes: a first starting moment and a first duration; and/or a first starting moment and a first ending moment.

Optionally, the indication function further includes second time domain information indicating uplink data in the uplink information.

Optionally, the second time domain information includes:
a second starting moment and a second duration; and/or
a second starting moment and a second ending moment.

Optionally, the uplink information includes uplink data and indication information, and the terminal implements the indication function through the indication information.

Figure 15:
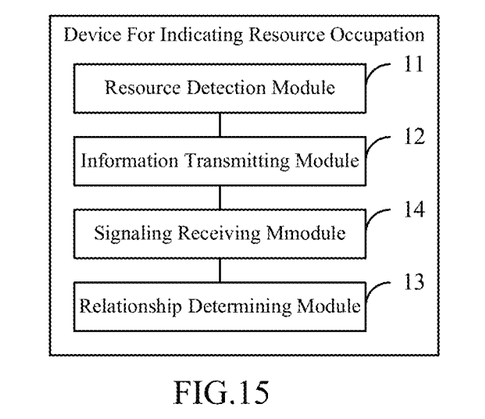
FIG. 15 is a schematic block diagram showing another device for indicating resource occupation according to an embodiment of the present disclosure.

FIG. 15 is a schematic block diagram of another device for indicating resource occupation according to an embodiment of the present disclosure. As shown in FIG. 15, based on the embodiment shown in FIG. 14, the device further includes a signaling receiving module 13 and a relationship determining module 14.

The signaling receiving module 13 is configured to receive signaling transmitted by the base station.

The relationship determining module 14 is configured to determine a first relationship in time domain between the uplink data and the indication information according to the signaling.

Wherein the information transmitting module 12 is configured to transmit the uplink data and the indication information to the base station according to the first relationship, in response to the first frequency domain resource is idle.

Figure 16:
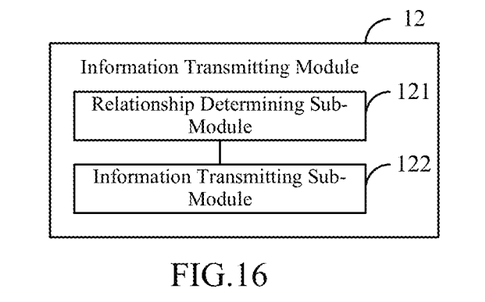
FIG. 16 is a schematic block diagram showing an information transmitting module according to an embodiment of the present disclosure.

FIG. 16 is a schematic block diagram showing an information transmitting module according to an embodiment of the present disclosure. As shown in FIG. 16, based on the embodiment shown in FIG. 14, the information transmitting module 12 includes a relationship determining sub-module 121 and an information transmitting sub-module 122.

The relationship determining sub-module 121 is configured to determine a second relationship in time domain between the uplink data and the indication information according to first pre-stored information.

The information transmitting sub-module 122 is configured to transmit the uplink data and the indication information to the base station according to the second relationship, in response to the first frequency domain resource is idle.

Optionally, the indication information is explicit information and/or implicit information.

Optionally, the uplink information includes uplink data, and the terminal implements the indication function through a traffic type of the uplink data.

Figure 17:
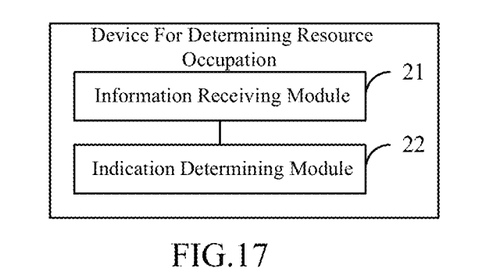
FIG. 17 is a schematic block diagram showing a device for determining resource occupation according to an embodiment of the present disclosure.

FIG. 17 is a schematic block diagram of a device for determining resource occupation according to an embodiment of the present disclosure. The device described in this embodiment can be applied to a base station, where the base station can communicate with a terminal which can be used as user equipment, and the terminal includes electronic equipment such as a mobile phone, a tablet computer, and a wearable device. The base station and the terminal can communicate based on 5G NR.

As shown in FIG. 17, the device for determining resource occupation may include an information receiving module 21 and an indication determining module 22.

The information receiving module 21 is configured to receive uplink information transmitted by a terminal;

The indication determining module 22 is configured to determine content indicated by the terminal according to the uplink information, and the content indicated by the terminal comprises whether the base station and the terminal being able to jointly occupy a first frequency domain resource in a unlicensed frequency band.

Optionally, the content indicated by the terminal further comprises first time domain information of the first frequency domain resource occupied by the terminal.

Optionally, the first time domain information includes:
a first starting moment and a first duration; and/or
a first starting moment and a first ending moment.

Optionally, the content indicated by the terminal further includes second time domain information of the uplink data in the uplink information.

Optionally, the second time domain information comprises:
a second starting moment and a second duration; and/or
a second start moment and a second ending moment.

Optionally, the uplink information includes uplink data and indication information, wherein the indication determining module is configured to determine the content indicated by the terminal according to the indication information.

Figure 18:
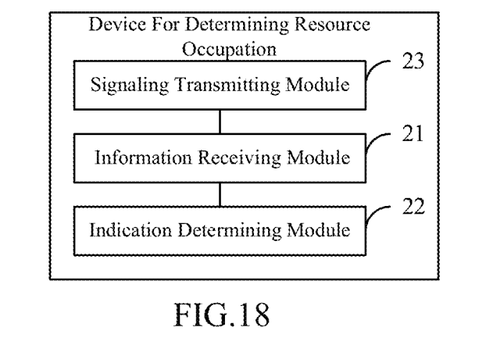
FIG. 18 is a schematic block diagram showing another device for determining resource occupation according to an embodiment of the present disclosure.

FIG. 18 is a schematic block diagram showing another device for determining resource occupation according to an embodiment of the present disclosure. As shown in FIG. 18, based on the embodiment shown in FIG. 17, the device further includes a signaling sending module 23.

The signaling sending module 23 is configured to transmit signaling to the terminal, wherein the signaling is used to indicate a first relationship in time domain between the uplink data and the indication information.

Optionally, the information receiving module 21 is configured to receive the uplink data and the indication information transmitted by the terminal according to the first relationship.

Figure 19:
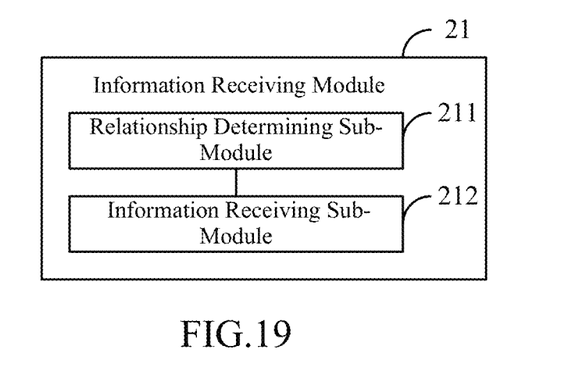
FIG. 19 is a schematic block diagram showing an information receiving module according to an embodiment of the present disclosure.

FIG. 19 is a schematic block diagram showing an information receiving module according to an embodiment of the present disclosure. As shown in FIG. 19, based on the embodiment shown in FIG. 17, the information receiving module 21 includes a relationship determining sub-module 211 and an information receiving sub-module 212.

The relationship determining sub-module 211 is configured to determine a second relationship in time domain between the uplink data and the indication information according to second pre-stored information.

The information receiving sub-module 212 is configured to receive the uplink data and the indication information according to the second relationship.

Optionally, the indication information is explicit information and/or implicit information.

Optionally, the uplink information includes uplink data, wherein the indication determining module is configured to determine the content indicated by the terminal according to a traffic type of the uplink data.

With regard to the device in the above embodiment, the specific manner in which each module performs operations has been described in detail in the embodiments of related methods, and will not be elaborated here.

For the device embodiment, since it basically corresponds to the method embodiment, the relevant part can be referred to the description of the method embodiment. The device embodiments described above are only schematic, wherein the units described as separate components may or may not be physically separated, and the components displayed as units may or may not be physical units, that is, they may be located in one place, or they may be distributed to multiple network elements. Some or all of the modules may be selected according to actual needs to achieve the purpose of the solution of this embodiment. Those of ordinary skill in the art can understand and implement without paying creative labor.

An embodiment of the present disclosure also proposes an electronic equipment, the electronic equipment includes:
a processor; and
a memory for storing instructions executable by the processor;
wherein the processor is configured to perform the steps in the method for indicating resource occupation and/or the method for determining resource occupation according to any one of the foregoing embodiments.

An embodiment of the present disclosure also proposes a computer-readable storage medium having computer instructions stored thereon, when the instructions are executed by a processor, the method for indicating resource occupation and/or the method for determining resource occupation according to any of the above embodiments is implemented.

Figure 20:
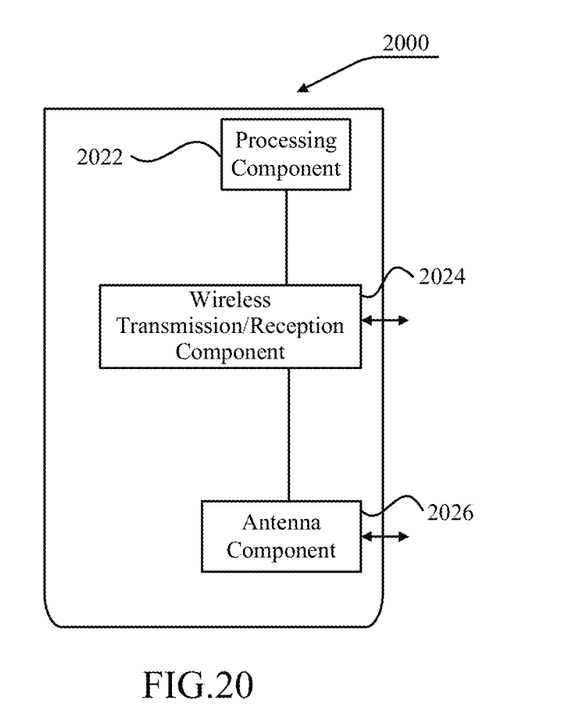
FIG. 20 is a schematic block diagram showing a device for determining resource occupation according to an embodiment of the present disclosure.

As shown in FIG. 20, FIG. 20 is a schematic block diagram showing a device 2000 for determining resource occupation according to an exemplary embodiment. The apparatus 2000 may be provided as a base station. Referring to FIG. 20, the device 2000 includes a processing component 2022, a wireless transmission/reception component 2024, an antenna component 2026, and a signal processing part unique to a wireless interface. The processing component 2022 may further include one or more processors. One of the processors in the processing component 2022 may be configured to perform steps of the method for determining resource occupation described in any of the above embodiments.

Figure 21:
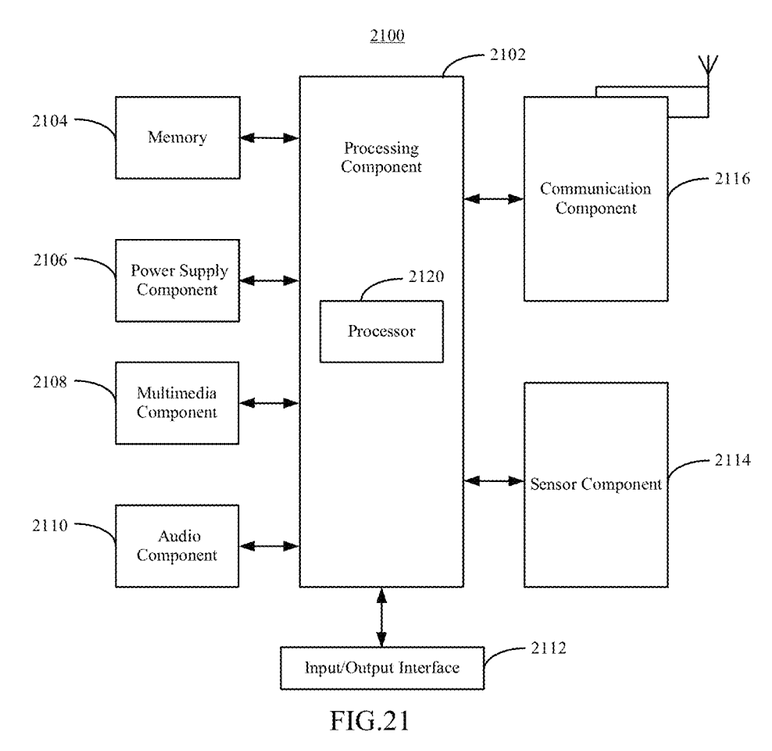
FIG. 21 is a schematic block diagram showing a device for indicating resource occupation according to an embodiment of the present disclosure.

FIG. 21 is a schematic block diagram showing a device 2100 for indicating resource occupation according to an exemplary embodiment. For example, the device 2100 may be a mobile phone, a computer, a digital broadcasting terminal, a message transceiving device, a game console, a tablet device, medical equipment, fitness equipment, a personal digital assistant, etc.

Referring to FIG. 21, the device 2100 may include one or more of the following components: a processing component 2102, a memory 2104, a power supply component 2106, a multimedia component 2108, an audio component 2110, an input/output (I/O) interface 2112, a sensor component 2114, and a communication component 2116.

The processing component 2102 generally controls the overall operations of the device 2100, such as operations associated with displaying, telephone calls, data communication, camera operations, and recording operations. The processing component 2102 may include one or more processors 2120 to execute instructions to complete all or part of the steps in the above method. In addition, the processing component 2102 may include one or more modules to facilitate interaction between the processing component 2102 and other components. For example, the processing component 2102 may include a multimedia module to facilitate interaction between the multimedia component 2108 and the processing component 2102.

The memory 2104 is configured to store various types of data to support operations at the device 2100. Examples of these data include instructions for any application or method operating on the device 2100, contact data, phone book data, messages, pictures, videos, and so on. The memory 2104 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 2106 provides power to various components of the device 2100. The power supply component 2106 may include a power supply management system, one or more power supplies, and other components associated with generating, managing, and distributing power for the device 2100.

The multimedia component 2108 includes a screen that provides an output interface between the device 2100 and the user. In some embodiments, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense a boundary of the touching operation or swiping operation, but also detect a duration and pressure related to the touching operation or swiping operation. In some embodiments, the multimedia component 2108 includes a front camera and/or a rear camera. When the device 2100 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 2110 is configured to output and/or input audio signals. For example, the audio component 2110 includes a microphone (MIC). When the device 2100 is in an operation mode, such as a call mode, a recording mode, and a voice recognition mode, the microphone is configured to receive an external audio signal. The received audio signal may be further stored in the memory 2104 or transmitted via the communication component 2116. In some embodiments, the audio component 2110 further includes a speaker for outputting audio signals.

The I/O interface 2112 provides an interface between the processing component 2102 and a peripheral interface module. The peripheral interface module may be a keyboard, a click wheel, a button and so on. These buttons may include, but are not limited to: home button, volume button, start button, and lock button.

The sensor assembly 2114 includes one or more sensors for providing the status assessment of various aspects for the device 2100. For example, the sensor component 2114 can detect the on/off state of the device 2100, and the relative positioning of the components, for example, the component is a display and a keypad of the device 2100, and the sensor component 2114 can also detect the position change of the device 2100 or a component of the device 2100, the presence or absence of user contact with the device 2100, the orientation or acceleration/deceleration of the device 2100, and the temperature change of the device 2100. The sensor assembly 2114 may include a proximity sensor configured to detect the presence of nearby objects without any physical contact. The sensor assembly 2114 may also include a light sensor, such as a CMOS or CCD image sensor, for use in imaging applications. In some embodiments, the sensor assembly 814 may also include an acceleration sensor, a gyro sensor, a magnetic sensor, a pressure sensor, or a temperature sensor.

The communication component 2116 is configured to facilitate wired or wireless communication between the device 2100 and other devices. The device 2100 can access a wireless network based on a communication standard, such as WiFi, 2G, or 3G, or a combination thereof. In an exemplary embodiment, the communication component 2116 receives a broadcast signal or broadcast related information from an external broadcast management system via a broadcast channel. In an exemplary embodiment, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 2100 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the receiving method described in any of the above embodiments.

In an exemplary embodiment, there is also provided a non-transitory computer-readable storage medium including instructions, such as a memory 2104 including instructions, which can be executed by the processor 2120 of the apparatus 2100 to complete the above method. For example, the non-transitory computer-readable storage medium may be ROM, random access memory (RAM), CD-ROM, magnetic tape, floppy disk, optical data storage device, or the like.

In some cases, the terminal may initiate the occupation of the first frequency domain resource in the unlicensed frequency band. According to the embodiment of the present disclosure, the terminal may initiate the occupation of the first frequency domain resource in the unlicensed frequency band. When the terminal detects the first frequency domain resource in the unlicensed frequency band and determines that the first frequency domain resource is idle, the terminal can occupy the first frequency domain resource and can transmit uplink information to the base station through the first frequency domain resource.

Since the uplink information has an indication function, the indication function includes indicating whether the base station can jointly occupy the first frequency domain resource with the terminal, so that after the base station receives the uplink information on the first frequency domain resource, it can determine whether the first frequency domain resource can be occupied jointly with the terminal.

Accordingly, the base station can be made to determine whether the first frequency domain resource can be occupied jointly (or shared) with the terminal, and then when it is determined that the first frequency domain resource can be occupied jointly with the terminal, the base station can jointly occupy the first frequency domain resource with the terminal to perform communication, so that the first frequency domain resource is not only occupied by the terminal, but also occupied by the base station, which is beneficial to improving the utilization rate of the frequency domain resource on the unlicensed frequency band.

After considering the description and practice of the disclosure disclosed herein, those skilled in the art will easily think of other implementations of the disclosure. The present application is intended to cover any variations, usage, or adaptive changes of the present disclosure that follow the general principles of the present disclosure and include common general knowledge or customary technical means in the technical field not disclosed in the present disclosure. The description and examples are to be considered exemplary only, and the true scope and spirit of this disclosure are pointed out by the following claims.

It should be understood that the present disclosure is not limited to the precise structure that has been described above and shown in the drawings, and various modifications and changes can be made without departing from the scope thereof. The scope of the present disclosure is limited only by the appended claims.

It should be noted that in the present application, relational terms such as first and second are used only to distinguish one entity or operation from another entity or operation, and do not necessarily require or imply there has any such actual relationship or order between these entities or operations. The terms "include", "comprise", or any other variant thereof are intended to cover non-exclusive inclusion, so that a process, method, article, or equipment that includes a series of elements comprises not only those elements, but also other elements that are not explicitly listed, or also comprises elements inherent to such process, method, article, or equipment. Without more restrictions, the element defined by the sentence "include one . . . " does not exclude that there are other identical elements in the process, method, article or equipment that includes the element.

The methods and devices provided by the embodiments of the present invention have been described in detail above. Specific examples in the present application are used to explain the principles and implementations of the present invention. The descriptions of the above embodiments are only used to help understand the present invention and its core idea; meanwhile, for those of ordinary skill in the art, according to the idea of the present invention, there will be changes in the specific implementation and application scope. In summary, the content of this specification should not be understood as a limitation of invention.

What is claimed is:

1. A method for indicating resource occupation, comprising:

detecting, by a terminal, a first frequency domain resource in an unlicensed frequency band to determine whether the first frequency domain resource is idle; and in response to determining that the first frequency domain resource is idle, transmitting, by the terminal, uplink information to a base station through the first frequency domain resource, wherein the uplink information comprises an indication function indicating whether the base station and the terminal are capable of jointly occupying the first frequency domain resource;

wherein the uplink information comprises uplink data and indication information, and the terminal implements the indication function through the indication information, and wherein the indication information comprises implicit information, and the implicit information comprises Radio Network Temporary Identity, RNTI, carried in the uplink information.

2. The method according to claim 1, wherein the indication information further comprises second time domain information indicating the uplink data in the uplink information.

3. The method according to claim 2, wherein the second time domain information comprises at least one of following parameters:

a second starting moment and a second duration; or a second starting moment and a second ending moment.

4. The method according to claim 1, further comprising:

receiving signaling transmitted by the base station; and determining a first relationship in time domain between the uplink data and the indication information according to the signaling, wherein, in response to determining that the first frequency domain resource is idle, transmitting the uplink information to the base station through the first frequency domain resource comprises:

in response to determining that the first frequency domain resource is idle, transmitting the uplink data and the indication information to the base station according to the first relationship.

5. The method according to claim 1, wherein in response to determining that the first frequency domain resource is idle, transmitting the uplink information to the base station through the first frequency domain resource comprises:

determining a second relationship in time domain between the uplink data and the indication information according to first pre-stored information; and in response to determining that the first frequency domain resource is idle, transmitting the uplink data and the indication information to the base station according to the second relationship.

6. The method according to claim 1, wherein the terminal implements the indication function through a traffic type of the uplink data, and the traffic type of the uplink data comprises a first traffic type, and wherein the first traffic type is configured to indicate that the base station and the terminal are capable of jointly occupying the first frequency domain resource, and a traffic type other than the first traffic type is configured to indicate that the base station and the terminal are not capable of jointly occupying the first frequency domain resource.

7. The method according to claim 1, wherein the implicit information further comprises scrambling sequence of Cyclic Redundancy Check.

8. The method according to claim 1, wherein the indication information further comprises first time domain information indicating that the terminal occupies the first frequency domain resource.

9. The method according to claim 8, wherein the first time domain information comprises at least one of following parameters:

a first starting moment of a time period, and a first duration of the time period, the base station and the terminal being capable of jointly occupying the first frequency domain resource during the time period; or a first starting moment of a time period, and a first ending moment of the time period, the base station and the terminal being capable of jointly occupying the first frequency domain resource during the time period.

10. A method for determining resource occupation, comprising:

receiving, by a base station, uplink information transmitted by a terminal; and determining, by the base station, content indicated by the terminal according to the uplink information, and the content indicated by the terminal comprises whether the base station and the terminal are capable of jointly occupying a first frequency domain resource in an unlicensed frequency band;

wherein the uplink information comprises uplink data and indication information, and determining the content indicated by the terminal according to the uplink information comprises:

determining the content indicated by the terminal according to the indication information; and wherein the indication information comprises implicit information, and the implicit information comprises Radio Network Temporary Identity, RNTI, carried in the uplink information.

11. The method according to claim 10, wherein the indication information further comprises second time domain information of the uplink data in the uplink information.

12. The method according to claim 11, wherein the second time domain information comprises at least one of following parameters:

a second starting moment and a second duration; or a second start moment and a second ending moment.

13. The method according to claim 10, further comprising:

transmitting signaling to the terminal, wherein the signaling is used to indicate a first relationship in time domain between the uplink data and the indication information.

14. The method according to claim 13, wherein receiving the uplink information transmitted by the terminal comprises:

receiving the uplink data and the indication information transmitted by the terminal according to the first relationship.

15. The method according to claim 10, wherein receiving the uplink information transmitted by the terminal comprises:

determining a second relationship in time domain between the uplink data and the indication information according to second pre-stored information; and receiving the uplink data and the indication information according to the second relationship.

16. The method according to claim 10, wherein determining the content indicated by the terminal according to the uplink information comprises:

determining the content indicated by the terminal according to a traffic type of the uplink data;

wherein the traffic type of the uplink data comprises a first traffic type, and wherein the first traffic type is configured to indicate that the base station and the terminal are capable of jointly occupying the first frequency domain resource, and a traffic type other than the first traffic type is configured to indicate that the base station and the terminal are not capable of jointly occupying the first frequency domain resource.

17. The method according to claim 10, wherein the implicit information further comprises scrambling sequence of Cyclic Redundancy Check.

18. The method according to claim 10, wherein the indication information further comprises first time domain information indicating that the terminal occupies the first frequency domain resource.

19. The method according to claim 18, wherein the first time domain information comprises at least one of following parameters:

a first starting moment of a time period, and a first duration of the time period, the base station and the terminal being capable of jointly occupying the first frequency domain resource during the time period; or a first starting moment of a time period, and a first ending moment of the time period, the base station and the terminal being capable of jointly occupying the first frequency domain resource during the time period.

20. An electronic device, comprising:

a processor; and a memory for storing instructions executable by the processor;

wherein, the processor is configured to
detect a first frequency domain resource in an unlicensed frequency band to determine whether the first frequency domain resource is idle; and
in response to determining that the first frequency domain resource is idle, transmit uplink information to the base station through the first frequency domain resource,
wherein the uplink information comprises an indication function indicating whether the base station and the terminal are capable of jointly occupying the first frequency domain resource;
wherein the uplink information comprises uplink data and indication information, and the terminal implements the indication function through the indication information, and wherein the indication information comprises implicit information, and the implicit information comprises Radio Network Temporary Identity, RNTI, carried in the uplink information.

* * * * *